(12) United States Patent
Kim et al.

(10) Patent No.: US 9,308,526 B2
(45) Date of Patent: Apr. 12, 2016

(54) VISIBLE LIGHT SENSITIVE PHOTOCATALYST, METHOD OF PRODUCING VISIBLE LIGHT SENSITIVE PHOTOCATALYST, AND ELECTROCHEMICAL WATER DECOMPOSITION CELL AND ORGANIC MATERIAL DECOMPOSITION SYSTEM EACH INCLUDING VISIBLE LIGHT SENSITIVE PHOTOCATALYST

(71) Applicant: Samsung Electronics Co., Ltd., Suwon-si, Gyeonggi-do (KR)

(72) Inventors: Tae-gon Kim, Hwaseong-si (KR); Seoung-jae Im, Seoul (KR); Tae-hyung Kim, Seoul (KR); Jeong-hee Lee, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 394 days.

(21) Appl. No.: 13/846,310

(22) Filed: Mar. 18, 2013

(65) Prior Publication Data
US 2013/0288889 A1    Oct. 31, 2013

(30) Foreign Application Priority Data
Apr. 25, 2012 (KR) .................. 10-2012-0043477

(51) Int. Cl.
*B01J 27/25* (2006.01)
*B01J 37/30* (2006.01)
(Continued)

(52) U.S. Cl.
CPC ... *B01J 27/25* (2013.01); *B01J 23/50* (2013.01); *B01J 23/66* (2013.01); *B01J 27/135* (2013.01); *B01J 35/004* (2013.01); *B01J 37/0081* (2013.01); *B01J 37/30* (2013.01); *C01B 3/042* (2013.01); *C02F 1/30* (2013.01); *C02F 1/725* (2013.01); *B01J 23/52* (2013.01); *B01J 23/72* (2013.01); *C02F 1/4672* (2013.01);
(Continued)

(58) Field of Classification Search
None
See application file for complete search history.

(56) References Cited

U.S. PATENT DOCUMENTS

| 8,187,473 B2 | 5/2012 | Prasad |
|---|---|---|
| 2006/0281961 A1 | 12/2006 | Prasad |

FOREIGN PATENT DOCUMENTS

| JP | 2004-097924 A | 4/2004 |
|---|---|---|
| JP | 2006-122777 A | 5/2006 |

(Continued)

OTHER PUBLICATIONS

Cui et al, fabrication of ag2sio3/sio2 composite nanotubes using a one step sacrifical templating solution approach, 2004, advanced materials, vol. 16, issue 13, 1109-1112.*

(Continued)

*Primary Examiner* — Melvin C Mayes
*Assistant Examiner* — Stefanie Cohen
(74) *Attorney, Agent, or Firm* — Cantor Colburn LLP

(57) ABSTRACT

A visible light sensitive photocatalyst including: a composite including a first metal oxide, a second metal oxide, and a heterojunction therebetween, wherein the first and second metal oxides each include a Group 11 metal, wherein a first bond between metal atoms of the first metal oxide has a length that is smaller than a Van der Waals distance between the metals of the first bond, wherein a second bond between metal atoms of the second metal oxide has a length that is smaller than a Van der Waals distance between the metals of the second bond, and, wherein the composite has a band gap energy of about 1.0 eV to about 2.5 eV.

20 Claims, 15 Drawing Sheets

(51) Int. Cl.
| | |
|---|---|
| B01J 23/50 | (2006.01) |
| B01J 23/66 | (2006.01) |
| B01J 35/00 | (2006.01) |
| B01J 37/00 | (2006.01) |
| C01B 3/04 | (2006.01) |
| C02F 1/30 | (2006.01) |
| C02F 1/72 | (2006.01) |
| B01J 27/135 | (2006.01) |
| B01J 23/52 | (2006.01) |
| B01J 23/72 | (2006.01) |
| C02F 101/30 | (2006.01) |
| C02F 1/467 | (2006.01) |

(52) U.S. Cl.
CPC ......... *C02F2101/30* (2013.01); *C02F 2303/04* (2013.01); *C02F 2305/10* (2013.01); *Y02E 60/364* (2013.01); *Y02E 60/366* (2013.01); *Y02W 10/37* (2015.05)

(56) References Cited

FOREIGN PATENT DOCUMENTS

| JP | 2011206766 A | 10/2011 |
|---|---|---|
| KR | 1020120138646 A | 12/2012 |
| WO | 2012173400 A3 | 12/2012 |

OTHER PUBLICATIONS

The Extended European Search Report for European Patent Application No. 13163961.9 dated Aug. 2, 2013.
The European Patent Examination for European Patent Application No. 13 163 961.9 dated Jul. 30, 2014.
S. Ouyang et al., "B-AgAl1-xGaxO2 Solid-Solution Photocatalysts: Continuous Modulation of Electronic Structure toward High-Performance Visible-Light Photoactivity," J. Am. Chem. Soc. 2011, 133, pp. 7757-7763.
Z. Yi et al., "An orthophosphate semiconductor with photooxidation properties under visible-light irradiation," Nature Materials, Jul. 2010, vol. 9, pp. 559-564.
J. Zhang et al., "Importance of the Relationship between Surface Phases and Photocatalytic Activity of TiO2," Angew. Chem. Int. Ed. 2008, 47, pp. 1766-1769.
Ouyang et al., "B—AgAl1—xGaxO2 Solid-Solution Photocatalysts: Continuous Modulation of Electronic Structure toward High-Performance Visible-Light Photoactivity", Journal of The American Chemical Society, vol. 133, 2011, pp. 7757-7763.
Yi et al., "An orthophosphate semiconductor with photooxidation properties under visible-light irradiation", Nature Materials, vol. 9, Jul. 2010, pp. 559-564.
Zhang et al., "Importance of the Relationship between Surface Phases and Photocatalytic Activity of TiO2**", Angew. Chem. Int. Ed., vol. 47, 2008, pp. 1766-1769.

\* cited by examiner

VISIBLE LIGHT SENSITIVE PHOTOCATALYST, METHOD OF PRODUCING VISIBLE LIGHT SENSITIVE PHOTOCATALYST, AND ELECTROCHEMICAL WATER DECOMPOSITION CELL AND ORGANIC MATERIAL DECOMPOSITION SYSTEM EACH INCLUDING VISIBLE LIGHT SENSITIVE PHOTOCATALYST

This application claims priority to and the benefit of Korean Patent Application No. 10-2012-0043477, filed on Apr. 25, 2012, and all the benefits accruing therefrom under 35 U.S.C. §119, the content of which is incorporated herein in its entirety by reference.

BACKGROUND

1. Field

The present disclosure relates to a visible light sensitive photocatalyst, and more particularly, to visible light sensitive photocatalyst capable of decomposing water, methods of producing the visible light sensitive photocatalyst, and an electrochemical water decomposition cell and an organic material decomposition system, each including the visible light sensitive photocatalyst.

2. Description of the Related Art

When a photocatalyst receives light having an energy level equal to or greater than a band gap energy, electrons are excited from a valence band to a conduction band, thereby disposing the electrons in the conduction band and forming holes in the valence band. The electrons and holes may diffuse to a surface of the photocatalyst and participate in oxidation and reduction reactions.

Photocatalysis is used to directly decompose water using solar energy to generate hydrogen, which is an alternative next-generation energy source. Photocatalysis may also be used to decompose volatile organic compounds (VOCs), offensive odors, and environmental hormones. Photocatalysts can be used to treat waste water and to treat decomposable refractory contamination materials. Also, photocatalysts can be used to sterilize germs and bacteria. Accordingly, a photocatalyst technology that uses only solar energy at room temperature would be useful for producing hydrogen and for environmental restoration, and is receiving attention for use as a powerful method for resolving environmental contamination.

Titanium dioxide ($TiO_2$) is used commercially as a photocatalyst, and has excellent organic material and water decomposition characteristics. However, $TiO_2$ provides photocatalysis only in response to ultraviolet light, which accounts for about 4% of solar light. Accordingly, to more effectively use the energy available in solar light, it would be desirable to have a photocatalyst material having improved visible light activity to more effectively use visible light, which accounts for about 43% of solar light.

SUMMARY

Provided is a visible light sensitive photocatalyst that has high visible light absorption, reduced charge transmission loss, and is capable of decomposing water.

Provided are methods of producing the visible light sensitive photocatalyst.

Provided is an electrochemical water decomposition cell and an organic material decomposition system, each including the visible light sensitive photocatalyst.

Additional aspects will be set forth in part in the description which follows and, in part, will be apparent from the description.

According to an aspect, a visible light sensitive photocatalyst includes a composite including a first metal oxide, a second metal oxide, and a heterojunction therebetween, wherein the first and second metal oxides each include a Group 11 metal, wherein a first bond between metal atoms of the first metal oxide has a length that is smaller than a Van der Waals distance between the metals of the first bond, wherein a second bond between metal atoms of the second metal oxide has a length that is smaller than a Van der Waals distance between the metals of the second bond, and, wherein the composite has a band gap energy ranging from about 1.0 to about 2.5 eV.

The visible light sensitive photocatalyst may be a composite of a first metal oxide represented by Formula 1 and a second metal oxide represented by Formula 2:

$$M1_m(Q_aA_{1-a})_bO_c \quad \text{Formula 1}$$

wherein, in Formula 1, $M^1$ is Cu, Ag, or Au, Q and A are each independently Si, Ge, or Sn, $1.5 \leq m \leq 2.5$, $0 \leq a \leq 1$, $0.7 \leq b \leq 1.3$, and $2.7 \leq c \leq 3.3$, $$M1_n\{(Q_dA_{1-d})O_e\}_fR^1_g \quad \text{Formula 2}$$

wherein, in Formula 2, M1 is Cu, Ag, or Au, Q and A are each independently Si, Ge, or Sn, $R^1$ is $-NO_3$, $-F$, $-Cl$, $-Br$, or $-I$, or a combination thereof, $8 \leq n \leq 10$, $0 \leq d \leq 1$, $3.5 \leq e \leq 4.5$, $1.5 \leq f \leq 2.5$, and $0.5 \leq g \leq 1.5$.

The first metal oxide of Formula 1 may be $Ag_2SiO_3$, and the second metal oxide of Formula 2 may be $Ag_9\{(Si_xGe_{1-x})O_4\}_2NO_3$ wherein $0 \leq x \leq 1$.

According to another aspect, a method of preparing a visible light sensitive photocatalyst includes: contacting a first metal oxide represented by Formula 3:

$$M^2_p(Q_qA_{1-q})_rO_s$$

wherein, in Formula 3, $M^2$ is Li, Na, K, Rb, Cs, Mg, Ca, Sr, Ba, or a combination thereof, Q and A are each independently Si, Ge, or Sn, $0.5 \leq p \leq 2.5$, $0 \leq q \leq 1$, $0.5 \leq r \leq 2.5$, and $2.5 \leq s \leq 7.5$, and a salt of the formula $M^1R^1$, wherein $M^1$ is a Group 11 metal and $R^1$ is $-NO_3$, $-F$, $-Cl$, $-Br$, $-I$, or a combination thereof; heating the mixture to ion exchange $M^2$ of the metal oxide of Formula 3 and a $M^1$ of the salt of the formula $M^1R^1$ to form a composite of a metal oxide represented by Formula 1 and a metal oxide represented by Formula 2 to form a heterojunction:

$$M^1_m(Q_aA_{1-a})_bO_c \quad \text{Formula 1}$$

wherein, in Formula 1, $M^1$ is Cu, Ag, or Au, Q and A are each independently Si, Ge, or Sn, $1.5 \leq m \leq 2.5$, $0 \leq a \leq 1$, $0.7 \leq b \leq 1.3$, and $2.7 \leq c \leq 3.3$, $$M^1_n\{(Q_dA_{1-d})O_e\}_fR^1_g \quad \text{Formula 2}$$

wherein, in Formula 2, $M^1$ is Cu, Ag, or Au, Q and A are each independently Si, Ge, or Sn, $R^1$ is $-NO_3$, $-F$, $-Cl$, $-Br$ or $-I$, or a combination thereof, $8 \leq n \leq 10$, $0 \leq d \leq 1$, $3.5 \leq e \leq 4.5$, $1.5 \leq f \leq 2.5$, and $0.5 \leq g \leq 1.5$, to prepare the visible light sensitive photocatalyst.

According to an aspect, disclosed is method of treating water, the method including: contacting water to be treated and the visible light sensitive photocatalyst disclosed above; and illuminating the water to be treated and the visible light sensitive photocatalyst with visible light to oxidize an organic material in the water to be treated to treat the water.

According to an aspect, an electrochemical water decomposition cell includes a working electrode including the visible light sensitive photocatalyst disclosed above, and a counter electrode.

According to an aspect, disclosed is an organic material decomposition system including a vessel, and the visible light sensitive photocatalyst disclosed above disposed in the vessel.

Also disclosed is photocatalyst including: a first metal oxide represented by Formula 1:

$$M^1_m(Q_aA_{1-a})_bO_c,\quad \text{Formula 1}$$

wherein, in Formula 1, $M^1$ is Cu, Ag, Au, or a combination thereof, Q and A are each independently Si Ge, or Sn, $1.5 \le m \le 2.5$, $0 \le a \le 1$, $0.7 \le b \le 1.3$, and $2.7 \le c \le 3.3$; a second metal oxide represented by Formula 2:

$$M^1_n\{(Q_dA_{1-d})O_e\}_f R^1_g \quad \text{Formula 2}$$

wherein, in Formula 2, $M^1$ is Cu, Ag, Au, or a combination thereof, Q and A are each independently Si, Ge, or Sn, $R^1$ is $-NO_3$, $-F$, $-Cl$, $-Br$, $-I$, or a combination thereof, $8 \le n \le 10$, $0 \le d \le 1$, $3.5 \le e \le 4.5$, $1.5 \le f \le 2.5$, and $0.5 \le g \le 1.5$; and a heterojunction between the first and second metal oxides.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
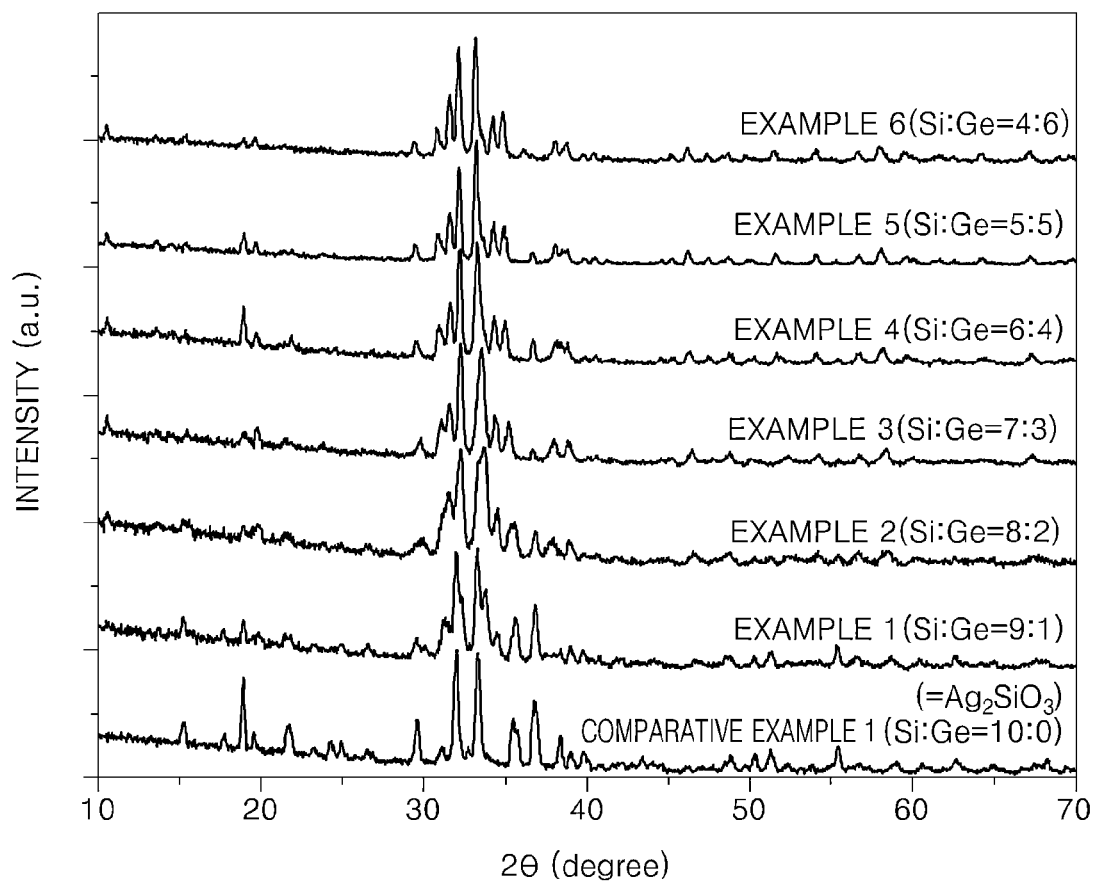
FIG. 1A is a graph of intensity (arbitrary units, a.u.) versus scattering angle (degrees two theta, 2θ) showing X-ray diffraction (XRD) spectra of photocatalyst powders prepared according to Examples 1 to 6, and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise stated, absolute energies or potentials are relative to a normal hydrogen electrode.

Hereinafter, an exemplary embodiment of a visible light sensitive photocatalyst will be disclosed in further detail.

According to an embodiment, a visible light sensitive photocatalyst comprises a composite comprising a heterojunction between a first metal oxide and a second metal oxide. The first and second metal oxides each independently include a Group 11 metal. For example, the metal of the first and second metal oxides may be the same or different, and the metal of each of the first and second metal oxides is independently Ag, Cu, or Au. The visible light sensitive photocatalyst includes a bond between the metal atoms which has a length that is smaller than a Van der Waals distance between the metal atoms. In an embodiment, a first bond between metal atoms of the first metal oxide has a length that is smaller than a Van der Waals distance between the metals of the first bond, and a second bond between metal atoms of the second metal oxide has a length that is smaller than a Van der Waals distance between the metals of the second bond. Ag has a Van der Waals distance of 3.44 Å, Cu has a Van der Waals distance of 2.80 Å, and Au has a Van der Waals distance of 3.32 Å. Also, each of the first and second metal oxides may each independently have a band gap energy (i.e., a band gap) of about 1.0 electron volt (eV) to about 2.5 eV, specifically about 1.1 eV to about 2.4 eV, more specifically about 1.2 eV to about 2.3 eV, and thus, the visible light sensitive photocatalyst including the first and second metal oxides may also have a band gap energy within this range. In an embodiment, the first and second metal oxides each have a band gap energy of about 1.0 electron volt (eV) to about 2.5 eV, specifically about 1.1 eV to about 2.4 eV, more specifically about 1.2 eV to about 2.3 eV.

The term "heterojunction" as used herein refers to an interface between materials having different band gaps, e.g., materials with different crystal structures, which enables effectively unimpeded migration of electrons between the materials.

While not wanting to be bound by theory, it is understood that in metals having a nd$^{10}$ electronic configuration, e.g., Ag, Cu, or Au, outermost electrons of a metal ion which are in a ground state fill the nd orbital. The visible light sensitive photocatalyst has the nd$^{10}$ electronic configuration, and thus may have a (n+1)s orbital with a large dispersion as a conduction band. In addition, the visible light sensitive photocatalyst has a bond between metal atoms which has a length that is smaller than a Van der Waals distance therebetween, and thus, electron mobility may be increased due to an overlap of electron orbitals. The metal oxides of the visible light sensitive photocatalyst contact to provide a heterojunction. At the heterojunction, and while not wanting to be bound by theory, it is understood that electrons and holes are separated from each other by an intrinsic potential so that a probability of recombination between the electrons and the holes is decreased. The visible light sensitive photocatalyst may have a band gap energy suitable for absorption of visible light, thereby more effectively using solar light. As described above, the visible light sensitive photocatalyst absorbs visible light, increases electron mobility, and increases the lifetimes of electrons and holes, thereby improving optical absorption efficiency and charge transfer efficiency of the visible light sensitive photocatalyst, resulting in increased efficiency thereof.

The visible light sensitive photocatalyst may be a composite comprising a first metal oxide represented by Formula 1 and a second metal oxide represented by Formula 2 that are combined to provide a heterojunction:

$$M^1_m(Q_aA_{1-a})_bO_c \qquad \text{Formula 1}$$

wherein, in Formula 1, $M^1$ is Cu, Ag, or Au, Q and A are each independently Si, Ge, or Sn, $1.5 \leq m \leq 2.5$, $0 \leq a \leq 1$, $0.7 \leq b \leq 1.3$, and $2.7 \leq c \leq 3.3$,

$$M^1_n\{(Q_dA_{1-d})O_e\}_fR^1_g \qquad \text{Formula 2}$$

wherein, in Formula 2, $M^1$ is Cu, Ag, or Au, Q and A are each independently Si Ge, or Sn, $R^1$ is an anion, $8 \leq n \leq 10$, $0 \leq d \leq 1$, $3.5 \leq e \leq 4.5$, $1.5 \leq f \leq 2.5$, and $0.5 \leq g \leq 1.5$. In an embodiment, Q is Si and A is Ge or Sn. In an embodiment, $R^1$ is —NO$_3$, —F, —Cl, —Br, or —I, or a combination thereof. In an embodiment, the first metal oxide is Ag$_2$SiO$_3$, and the second metal oxide is Ag$_9${(Si$_x$Ge$_{1-x}$)O$_4$}$_2$NO$_3$ wherein $0 \leq x \leq 1$, specifically $0.1 \leq x \leq 0.5$, and the Ag$_2$SiO$_3$ and Ag$_9${(Si$_x$Ge$_{1-x}$)O$_4$}$_2$NO$_3$ form a heterojunction.

The composite of the metal oxides of Formulas 1 and 2 may have a band gap energy from about 1.0 to about 2.5 electron volts (eV), specifically about 1.1 to about 2.4 eV, more specifically about 1.2 to about 2.3 eV. A distance between metals $M^1$ may be smaller than a Van der Waals distance therebetween.

The visible light sensitive photocatalyst may be a composite of Ag$_2$SiO$_3$ and Ag$_9${(Si, Ge)O$_4$}$_2$NO$_3$ that are combined to provide a heterojunction. The Ag$_9${(Si, Ge)O$_4$}$_2$NO$_3$ may be obtained by substituting some Si atoms of Ag$_9$(SiO$_4$)$_2$NO$_3$ with Ge.

Ag$_2$SiO$_3$ has a band gap energy of about 2.75 eV, and Ag$_9${(Si, Ge)O$_4$}$_2$NO$_3$ has a band gap energy from about 1.8 to about 2.1 eV. The visible light sensitive photocatalyst comprising Ag$_2$SiO$_3$ and Ag$_9${(Si, Ge)O$_4$}$_2$NO$_3$, when combined to provide a heterojunction, may have an effective band gap energy ranging from about 1.7 to about 2.4 eV. While not wanting to be bound by theory, it is understood that because the band gap energy is equal to or less than about 3.1 eV, which is a maximum band gap energy that enables absorption of visible rays, the visible light sensitive photocatalyst is capable of absorbing visible light, which accounts for about 45% of sunlight, whereby it has a very high optical absorption efficiency for sunlight. The effective band gap energy refers to an optical band gap provided by a mixture of materials with different band gaps that are combined to provide a heterojunction.

For example, Ag$_2$SiO$_3$ and Ag$_9${(Si, Ge)O$_4$}$_2$NO$_3$ each include a distance between Ag atoms that is smaller than a Van der Waals distance therebetween, i.e., 3.44 Å, which, while not wanting to be bound by theory, it is understood to provide for an increased overlap between the 5s orbitals of the Ag atoms. While not wanting to be bound by theory, it is understood that the conduction band of $Ag_2SiO_3$ and $Ag_9\{(Si, Ge)O_4\}_2NO_3$ consists of primarily the 5s orbital of Ag, and thus the improved overlap between the 5s orbitals of the Ag atoms leads to increased electron mobility. High electron mobility may reduce a probability of recombination between and losses of excited electrons and holes generated in the visible light sensitive photocatalyst by irradiation of light, and may also effectively transfer electrons and holes onto a surface of the visible light sensitive photocatalyst, on which a reaction occurs.

$Ag_2SiO_3$ and $Ag_9\{(Si, Ge)O_4\}_2NO_3$ each have a different band gap energy, and thus, when they are combined to provide a junction, an intrinsic potential is provided, like a PN junction of a semiconductor. The electrons and holes generated by irradiation of light are physically separated from each other by the intrinsic potential so that a probability of recombination between the electrons and the holes is decreased, whereby the lifetimes of the electrons and the holes are increased, resulting in increased efficiency of the visible light sensitive photocatalyst.

The photocatalyst may have a particle size, e.g., an average largest particle size, of about 10 nanometers (nm) to about 100 micrometers (μm), specifically about 1 μm to about 90 μm, more specifically about 2 μm to about 60 μm.

Also disclosed is an electrode comprising the photocatalyst. The electrode may comprise a conductive agent. The conductive agent may comprise carbon, a metal, a conductive polymer, or a combination thereof. The carbon may comprise carbon black, graphite, graphene, carbon fibers, amorphous carbon, activated carbon, or a combination thereof. The metal may comprise any suitable metal, and may comprise silver, platinum, gold, nickel, tin, aluminum, or a combination thereof. Examples of conductive polymers include polyaniline-based polymers, polypyrrole-based polymers, polyethyleneoxide-based polymers, polythiophene-based polymers, and combinations or copolymers thereof. The conductive agent may be contained in an amount of about 1 weight percent (wt %) to about 90 wt %, based on a total weight of the electrode. The electrode may further comprise a substrate on which the photocatalyst and conductive agent are disposed. Suitable substrates include a glass, plastic, or metal substrate.

Also disclosed is an electrochemical water decomposition cell. The electrochemical water decomposition cell comprises a working electrode comprising the visible light sensitive photocatalyst and a counter electrode. The working electrode may be an electrode as disclosed above. The counter electrode may comprise any suitable material, and may comprise, for example, platinum, silver, nickel, aluminum, or gold. The electrochemical water decomposition cell may further comprise a reference electrode. A representative reference electrode is a Ag/AgCl reference electrode. An electrolyte may be added to the electrochemical water decomposition cell. The electrolyte may comprise a salt and optionally water. The salt may comprise an alkali metal and an alkaline earth metal and an anion. Representative anions include —$NO_3$, —F, —Cl, —Br, —I, or a combination thereof. Potassium nitrate ($KNO_3$) is specifically mentioned.

Also disclosed is an organic material decomposition system comprising a vessel and the visible light sensitive photocatalyst disposed in the vessel. The vessel may be any suitable container, and may be a tank, a flask, a tube, a bucket, or a pond. The vessel may be transparent. The organic material decomposition system may further comprise an agitator or a mixer if desired.

Hereinafter, an embodiment of a method of preparing the visible light sensitive photocatalyst will be disclosed in further detail.

First, a salt of a Group 1 or 2 metal of the formula $M^2X$, and Si oxide, Ge oxide, Sn oxide, or a combination thereof are contacted (e.g., mixed) to form a first mixture. In this regard, the first mixture may be in the form of a powder. The Group 1 or 2 metal $M^2$ may be Li, Na, K, Rb, Cs, Mg, Ca, Sr, Ba, or a combination thereof. In the salt of the Group 1 or 2 metal, X may be —$CO_3$, —$NO_3$, —NaCl, —F, —OH, acetate, or a combination thereof. The salt of the Group 1 or 2 metal of the formula $M^2X$ may be, for example, $Na_2CO_3$, $NaNO_3$, NaCl, NaF, NaOH, Na acetate, $BaCO_3$, $Ba(NO_3)_2$, $BaCl_2$, $BaF_2$, $Ba(OH)_2$, Ba acetate, or a combination thereof.

The first mixture is heated to form a metal oxide represented by Formula 3 that includes the Group 1 or 2 metal $M^2$, and Si, Ge, Sn, or a combination thereof:

$$M^2_p(Q_qA_{1-q})_rO_s \qquad \text{Formula 3}$$

wherein, in Formula 3, $M^2$ is Li, Na, K, Rb, Cs, Mg, Ca, Sr, Ba, or a combination thereof, Q and A are each independently Si, Ge, or Sn, $0.5 \leq p \leq 2.5$, $0 \leq q \leq 1$, $0.5 \leq r \leq 2.5$, and $2.5 \leq s \leq 7.5$. In an embodiment, Q is Si and A is Ge or Sn.

The heating process may be performed in an air atmosphere at a temperature from about 500° C. to about 1,500° C. for about 5 to about 500 hours. For example, the first mixture may be heated in an air atmosphere at a temperature from about 500° C. to about 1,500° C. for about 1 to about 100 hours, specifically about 450° C. to about 1,400° C., more specifically about 400° C. to about 1,300° C. for about 2 to about 450 hours, specifically about 4 to about 400 hours. A molar ratio of Q to A may be selected by selecting a molar ratio of the Si oxide, the Ge oxide, or the Sn oxide, if present.

Subsequently, the metal oxide of Formula 3 and a metal salt of the formula $M^1R^1$ of a Group 11 metal $M^1$ having an electronic configuration of $nd^{10}$ wherein n is 3, 4, or 5 are contacted, e.g., mixed together, to form a second mixture. The Group 11 metal $M^1$ may be Ag, Cu, or Au. The metal salt of the formula $M^1R^1$ may be, for example, $AgNO_3$, AgCl, AgF, AgBr, AgI, $CuNO_3$, CuCl, CuF, CuBr, CuI, $AuCl_3$, or AuI. The second mixture may be in the form of a powder.

The second mixture is heated to ion exchange an ion of the Group 1 or 2 metal $M^2$ of the metal oxide of Formula 3 and an ion of the Group 11 metal $M^1$ of the metal salt $M^1R^1$. The heating process of the second mixture may be performed in an air atmosphere at a temperature of about 200° C. to about 400° C., specifically about 225° C. to about 375° C., more specifically about 250° C. to about 350° C., for about 1 to about 100 hours, specifically about 2 to about 90 hours, more specifically about 3 to about 80 hours. The ion-exchanged second mixture may be washed. The washing may be performed by contacting the ion-exchanged second mixture with water, or an aqueous solution. As a result of the ion exchange process, a composite comprising a metal oxide represented by Formula 1 and a metal oxide represented by Formula 2 is obtained:

$$M^1_m(Q_aA_{1-a})_bO_c \qquad \text{Formula 1}$$

wherein, in Formula 1, $M^1$ is Cu, Ag, or Au, Q and A are each independently Si, Ge or Sn, $1.5 \leq m \leq 2.5$, $0 \leq a \leq 1$, $0.7 \leq b \leq 1.3$, and $2.7 \leq c \leq 3.3$,

$$M^1_n\{(Q_dA_{1-d})O_e\}_fR^1_g \qquad \text{Formula 2}$$

wherein, in Formula 2, $M^1$ is Cu, Ag, or Au, Q and A are each independently Si, Ge or Sn, $R^1$ is an anion, $8 \leq n \leq 10$, $0 \leq d \leq 1$, $3.5 \leq e \leq 4.5$, $1.5 \leq f \leq 2.5$, and $0.5 \leq g \leq 0.5$. In an embodiment, Q is Si and A is Ge or Sn. In an embodiment, $R^1$ is —$NO_3$, —F, —Cl, —Br, or —I, or a combination thereof. The composite is effective as a visible light sensitive photocatalyst.

The metal oxide of Formula 1 and the metal oxide of Formula 2 of the composite are combined to form a heterojunction.

A molar ratio of the first metal oxide of Formula 1 to the second metal oxide of Formula 2 in the composite may be selected by selecting a molar ratio of Q to A of Formula 3. For example, the molar ratio of the first metal oxide of Formula 1 to the second metal oxide of Formula 2 may be in a range of about 100:1 to about 1:100, specifically about 90:10 to about 10:90, more specifically about 80:20 to about 20:80, or about 70:30 to about 30:70, specifically about 60:40 to about 40:60, more specifically about 55:45 to about 45:55.

According to the method of preparing the visible light sensitive photocatalyst, a photocatalyst composite comprising two different metal oxides that are combined to provide heterojunction may be prepared by ion exchange between a metal oxide and a metal salt. Electrons and holes generated in the photocatalyst may be physically separated from each other by the intrinsic potential formed by the heterojunction so that a probability of recombination between the electrons and the holes decreases, resulting in increased efficiency of the visible light sensitive photocatalyst.

Hereinafter, a method of preparing the visible light sensitive photocatalyst, according to another embodiment, will be further disclosed.

First, $BaCO_3$, $SiO_2$, and $GeO_2$ are contacted, e.g., mixed, such that a molar ratio of Ba to (Si+Ge) is 1:1 and then heated to prepare a Ba(Si, Ge)$O_3$, which may be in the form of a powder. The Ba(Si, Ge)$O_3$ may be isostructural with $BaSiO_3$ in which some of Si atoms are substituted with Ge, or isostructural with $BaGeO_3$ in which some Ge atoms are substituted with Si. In this regard, the mixture of $BaCO_3$, $SiO_2$, and $GeO_2$ may be heated in an air atmosphere at a temperature of about 1,000° C. to about 1,400° C., specifically about 1,200° C. to about 1,300° C., for about 1 to about 30 hours, specifically about 8 to about 12 hours.

Subsequently, the Ba(Si, Ge)$O_3$ powder and an Ag salt, e.g., $AgNO_3$ powder, are mixed and heated to ion exchange the Ba ion of Ba(Si, Ge)$O_3$ with the Ag ion of $AgNO_3$. The mixture of Ba(Si, Ge)$O_3$ and $AgNO_3$ may be heated in an air atmosphere at a temperature from about 200° C. to about 400° C. for about 5 to about 30 hours. After the heating process is completed, the heated mixture may be washed with water, e.g., distilled water, and then dried. As a result of the ion exchange process, a composite of $Ag_2SiO_3$ and $Ag_9\{(Si,Ge)O_4\}_2NO_3$, which are combined to provide heterojunction, may be obtained.

$Ag_2SiO_3$ may be formed by contacting, e.g., mixing, $BaSiO_3$ and $AgNO_3$ and ion exchanging barium and silver, and $Ag_9(GeO_4)_2NO_3$ may be formed by contacting, e.g., mixing, $BaGeO_3$ and $AgNO_3$ and ion exchanging barium and silver. In this regard, $Ag_2SiO_3$ and $Ag_9\{(Si,Ge)O_4\}_2NO_3$ are simultaneously formed by contacting, e.g., mixing, Ba(Si, Ge)$O_3$ and $AgNO_3$ and ion exchanging the barium and silver. In this regard, $Ag_2SiO_3$ and $Ag_9\{(Si,Ge)O_4\}_2NO_3$ may be combined to provide a heterojunction. A ratio of $Ag_2SiO_3$ to $Ag_9\{(Si,Ge)O_4\}_2NO_3$ may vary according to a ratio of $SiO_2$ to $GeO_2$, which are reactants. A ratio of Si to Ge in $Ag_9\{(Si,Ge)O_4\}_2NO_3$ may vary depending upon a ratio of $SiO_2$ to $GeO_2$. Alternatively, AgF, AgCl, AgBr, AgI, or the like may be used instead of $AgNO_3$. In an embodiment, AgF, AgCl, AgBr, AgI, $AgNO_3$, or a combination thereof may be used. $AgNO_3$ is specifically mentioned.

Also disclosed is a method of treating water. The method may comprise contacting water to be treated and the visible light sensitive photocatalyst; and illuminating the water to be treated and the visible light sensitive photocatalyst with visible light to oxidize an organic material in the water to be treated to treat the water. The organic material may comprise an organic compound, an enzyme, a protein, a virus, a germ, a bacteria, or a combination thereof.

One or more embodiments will now be described more fully with reference to the following examples. However, these examples are provided only for illustrative purposes and shall not limit the scope of this disclosure.

EXAMPLES

Example 1

Preparation of Ag—Si—Ge—O (Si:Ge=9:1) Photocatalyst Composite

A photocatalyst powder was synthesized by ion exchange. 1 gram (g) of $BaCO_3$ and 0.274 g/0.053 g of $SiO_2$/$GeO_2$ (Si:Ge=9:1) were mixed in a mortar, and then heated in an electric furnace in air at a temperature of 1,250° C. for 10 hours to prepare a Ba($Si_{0.9}Ge_{0.1}$)$O_3$ powder.

The Ba($Si_{0.9}Ge_{0.1}$)$O_3$ powder was pulverized in a mortar and mixed with 10 g of an $AgNO_3$ powder. The mixed powders were heated in an electric furnace in air at a temperature of 300° C. for 20 hours to exchange the Ba ions of Ba($Si_{0.9}Ge_{0.1}$)$O_3$ with the Ag ions of $AgNO_3$. After the ion exchange, the heated powders were added to distilled water and stirred for about 30 minutes to dissolve the residual $AgNO_3$ and Ba($NO_3$)$_2$ in the distilled water. Then, the product was washed three times with distilled water and composite powder of $Ag_2SiO_3$ and $Ag_9\{(Si,Ge)O_4\}_2NO_3$ having a heterojunction therebetween. The composition of the photocatalyst was confirmed by X-ray diffraction (XRD) analysis.

Example 2

Preparation of Ag—Si—Ge—O (Si:Ge=8:2) Photocatalyst Composite

A powder-type Ag—Si—Ge—O (Si:Ge=8:2) photocatalyst composite of $Ag_2SiO_3$ and $Ag_9\{(Si,Ge)O_4\}_2NO_3$ having a heterojunction was prepared in the same manner as in Example 1, except that 0.244 g/0.106 g of $SiO_2$/$GeO_2$(Si:Ge=8:2) was used instead of 0.274 g/0.053 g of $SiO_2$/$GeO_2$ (Si:Ge=9:1). The composition of the photocatalyst was confirmed by XRD analysis.

Example 3

Preparation of Ag—Si—Ge—O (Si:Ge=7:3) Photocatalyst Composite

A powder-type Ag—Si—Ge—O (Si:Ge=7:3) photocatalyst composite of $Ag_2SiO_3$ and $Ag_9\{(Si,Ge)O_4\}_2NO_3$ having a heterojunction was prepared in the same manner as in Example 1, except that 0.213 g/0.159 g of $SiO_2$/$GeO_2$(Si:Ge=7:3) was used instead of 0.274 g/0.053 g of $SiO_2$/$GeO_2$ (Si:Ge=9:1). The composition of the photocatalyst was confirmed by XRD analysis.

Example 4

Preparation of Ag—Si—Ge—O (Si:Ge=6:4) Photocatalyst Composite

A powder-type Ag—Si—Ge—O (Si:Ge=6:4) photocatalyst composite of $Ag_2SiO_3$ and $Ag_9\{(Si,Ge)O_4\}_2NO_3$ having a heterojunction was prepared in the same manner as in Example 1, except that 0.182 g/0.212 g of $SiO_2/GeO_2$(Si:Ge=6:4) was used instead of 0.274 g/0.053 g of $SiO_2/GeO_2$ (Si:Ge=9:1). The composition of the photocatalyst was confirmed by XRD analysis.

Example 5

Preparation of Ag—Si—Ge—O (Si:Ge=5:5) Photocatalyst Composite

A powder-type Ag—Si—Ge—O (Si:Ge=5:5) photocatalyst composite of $Ag_2SiO_3$ and $Ag_9\{(Si,Ge)O_4\}_2NO_3$ having a heterojunction was prepared in the same manner as in Example 1, except that 0.150 g/0.265 g of $SiO_2/GeO_2$(Si:Ge=5:5) was used instead of 0.274 g/0.053 g of $SiO_2/GeO_2$ (Si:Ge=9:1). The composition of the photocatalyst was confirmed by XRD analysis.

Example 6

Preparation of Ag—Si—Ge—O (Si:Ge=4:6) Photocatalyst Composite

A powder-type Ag—Si—Ge—O (Si:Ge=4:6) photocatalyst composite of $Ag_2SiO_3$ and $Ag_9\{(Si,Ge)O_4\}_2NO_3$ having a heterojunction was prepared in the same manner as in Example 1, except that 0.122 g/0.318 g of $SiO_2/GeO_2$(Si:Ge=4:6) was used instead of 0.274 g/0.053 g of $SiO_2/GeO_2$ (Si:Ge=9:1). The composition of the photocatalyst was confirmed by XRD analysis.

Comparative Example 1

Preparation of $Ag_2SiO_3$ Photocatalyst Powder

An $Ag_2SiO_3$ photocatalyst powder was prepared in the same manner as in Example 1, except that 0.3 g of $SiO_2$ was used instead of 0.274 g/0.053 g of $SiO_2/GeO_2$ (Si:Ge=9:1). The composition of the photocatalyst was confirmed by XRD analysis.

Comparative Example 2

Preparation of $Ag_9(SiO_4)_2NO_3$ Photocatalyst Powder 1.67 g of $CaCO_3$ and 0.5 g of $SiO_2$ were mixed in a mortar, and then heated in an electric furnace in air at a temperature of 1350° C. for 10 hours to prepare a $Ca_2SiO_4$ powder.

The $Ca_2SiO_4$ powder was pulverized in a mortar and mixed with 10 g of an $AgNO_3$ powder. The mixed powders were heated in an electric furnace in air at a temperature of 300° C. for 20 hours to exchange the Ca ions of $Ca_2SiO_4$ with the Ag ions of $AgNO_3$. After the ion exchange, the heated powders were added to distilled water and stirred for about 30 minutes to dissolve the residual $AgNO_3$ and $Ca(NO_3)_2$ in the distilled water. Then, the product was washed three times with distilled water and dried in the dark, thereby completing the preparation of an $Ag_9(SiO_4)_2NO_3$ photocatalyst powder. The composition of the photocatalyst was confirmed by an XRD analysis.

Comparative Example 3

Preparation of $Ag_9(GeO_4)_2NO_3$ Photocatalyst Powder 1.32 g of $BaCO_3$ and 0.7 g of $GeO_2$ were mixed in a mortar, and then heated in an electric furnace in air at a temperature of 1100° C. for 10 hours to prepare a $BaGeO_3$ powder.

The $BaGeO_3$ powder was pulverized in a mortar and mixed with 10 g of an $AgNO_3$ powder. The mixed powders were heated in an electric furnace in air at a temperature of 300° C. for 20 hours to exchange the Ba ions of $BaGeO_3$ with the Ag ions of $AgNO_3$. After the ion exchange, the heated powders were added to distilled water and stirred for about 30 minutes to dissolve the residual $AgNO_3$ and $Ba(NO_3)_2$ in the distilled water. Then, the product was washed three times with distilled water and dried in the dark, thereby completing the preparation of an $Ag_9(GeO_4)_2NO_3$ photocatalyst powder. The composition of the photocatalyst was confirmed by XRD analysis.

XRD Data

Figure 1B:
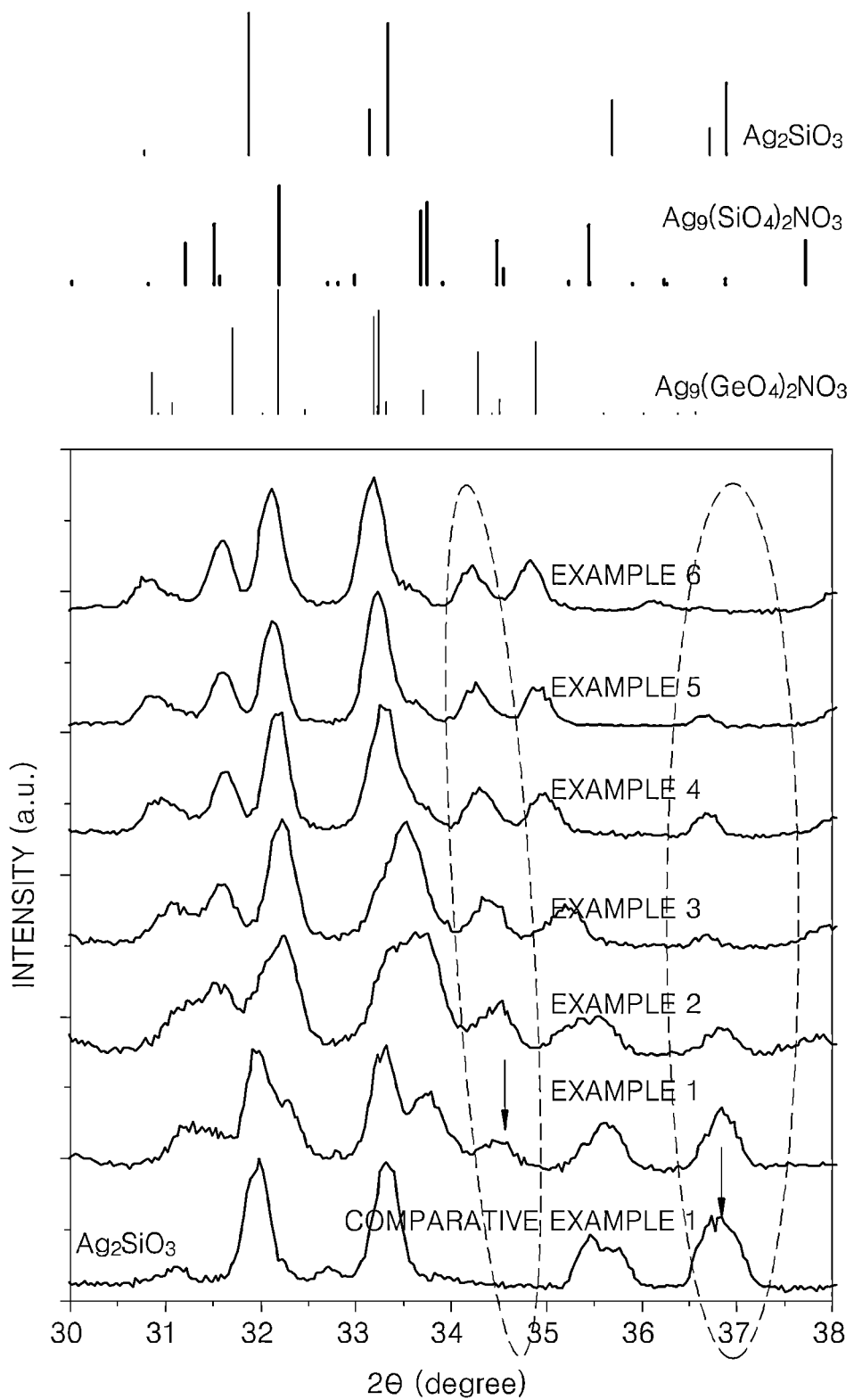
FIG. 1B is an enlarged view of a portion of each XRD spectrum of FIG. 1A between 30 and 38 degrees 2θ, and calculated idealized patterns for $Ag_2SiO_3$, $Ag_9(SiO_4)_2NO_3$, and $Ag_9(GeO_4)_2NO_3$.

FIG. 1A is a graph showing XRD spectra of the photocatalyst powders prepared according to Examples 1 to 6 and Comparative Example 1. FIG. 1B is an enlarged view of a portion of a 2θ region of each XRD spectrum of FIG. 1A.

In FIGS. 1A and 1B, a peak (left dashed region) around 2θ=34.5° is derived from $Ag_9\{(Si,Ge)O_4\}_2NO_3$, and a peak (right dashed region) around 2θ=37° is derived from $Ag_2SiO_3$. Referring to FIGS. 1A and 1B, it is confirmed that as a ratio of Ge to Si (i.e., $GeO_2$ to $SiO_2$) that are used in the preparation of the photocatalyst increases, the intensity of the peak around 2θ=37° decreases and the intensity of the peak around 2θ=34.5° increases. This result indicates that as the ratio of Ge to Si (i.e., $GeO_2$ to $SiO_2$) that are used in the preparation of the photocatalyst increases, the amount of $Ag_2SiO_3$ decreases so that a ratio of $Ag_9\{(Si, Ge)O_4\}_2NO_3/Ag_2SiO_3$ increases. In addition, it is confirmed that as the ratio of Ge to Si (i.e., $GeO_2$ to $SiO_2$) increases, the peak around 2θ=34.5° moves to lower angle. This result indicates that as the ratio of Ge to Si (i.e., $GeO_2$ to $SiO_2$) increases, a ratio of Ge to Si in $Ag_9\{(Si, Ge)O_4\}_2NO_3$ of the photocatalyst powder increases.

Figure 2A:
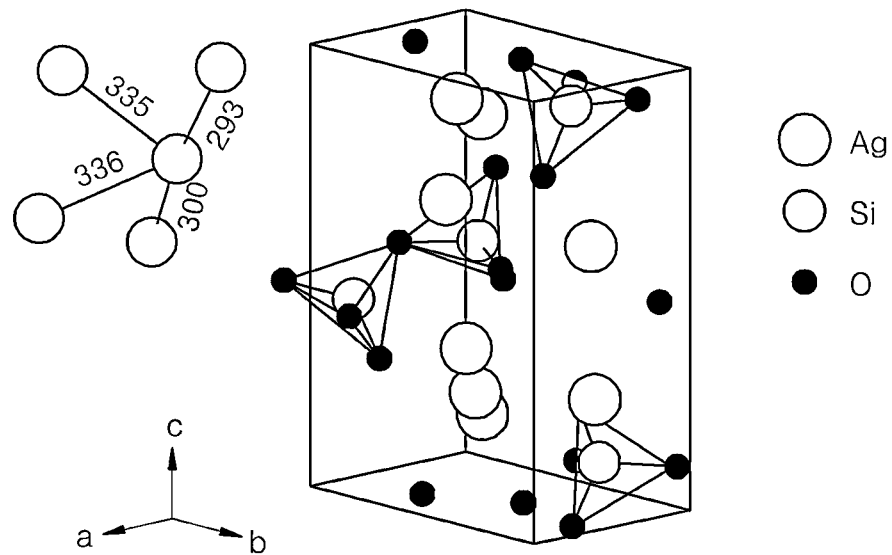
FIGS. 2A through 2C are diagrams showing an embodiment of crystal structures of $Ag_2SiO_3$, $Ag_9(SiO_4)_2NO_3$, and $Ag_9(GeO_4)_2NO_3$, respectively.
Figure 2B:
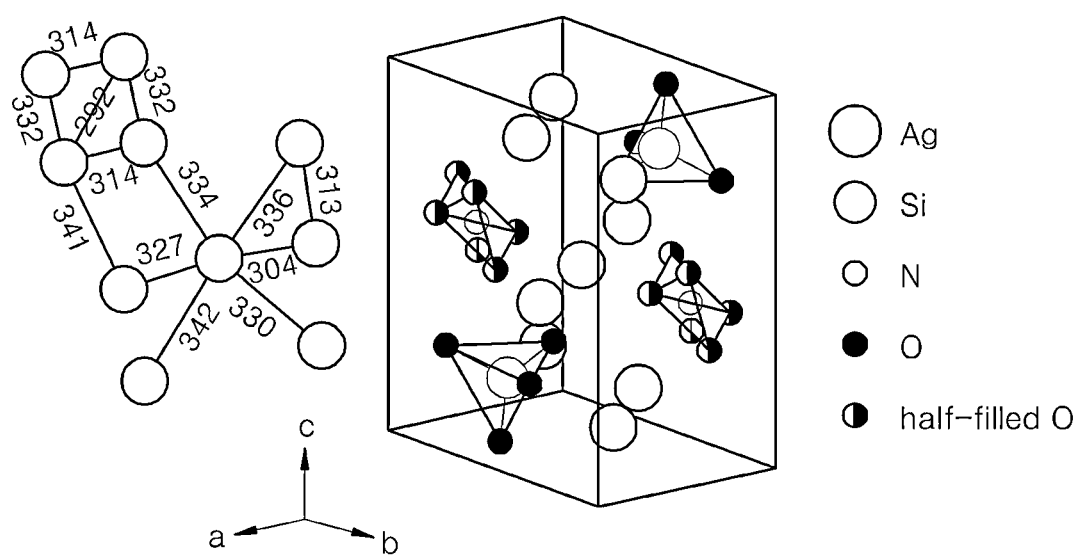
Figure 2C:
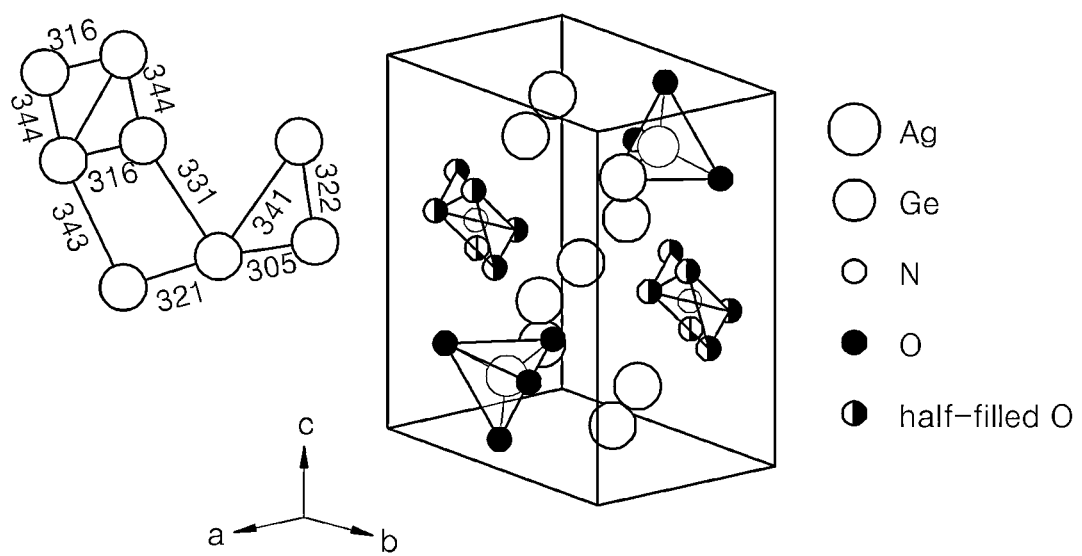

FIGS. 2A through 2C are diagrams showing crystal structures of $Ag_2SiO_3$, $Ag_9(SiO_4)_2NO_3$, and $Ag_9(GeO_4)_2NO_3$, respectively. Referring to FIG. 2A, the crystal structure of $Ag_2SiO_3$ has a space group ($P2_12_12_1$) of the orthorhombic system, and has lattice constants of a=4.53 Å, b=7.11 Å, and c=9.96 Å. Referring to FIG. 2B, the crystal structure of $Ag_9(SiO_4)_2NO_3$ has a space group (P-1) of the triclinic system, and has lattice constants of a=5.76 Å, b=6.76 Å, c=8.84 Å, α=107.03°, β=99.87°, and γ=94.16°. Referring to FIG. 2C, the crystal structure of $Ag_9(GeO_4)_2NO_3$ has a space group (P-1) of the triclinic system, and has lattice constants of a=5.89 Å, b=6.84 Å, c=8.85 Å, α=106.28°, β=98.94°, and γ=95.83°.

Referring to FIGS. 2A through 2C, a distance between Ag atoms in the crystal structures of $Ag_2SiO_3$, $Ag_9(SiO_4)_2NO_3$, and $Ag_9(GeO_4)_2NO_3$ includes 2.93 Å, 3.00 Å, 3.35 Å and 3.36 Å; 2.92 Å, 3.04 Å, 3.13 Å, 3.14 Å, 3.27 Å, 3.30 Å, 3.32 Å, 3.34 Å, 3.36 Å, 3.41 Å and 3.42 Å; and 3.05 Å, 3.16 Å, 3.21 Å, 3.22 Å, 3.31 Å, 3.41 Å, 3.43 Å and 3.44 Å, respectively. That is, the crystal structures of $Ag_2SiO_3$, $Ag_9(SiO_4)_2NO_3$, and $Ag_9(GeO_4)_2NO_3$ include a bond between Ag atoms which has a length that is smaller than a Van der Waals distance (i.e., 3.44 Å) therebetween. Due to this, an overlap of electron orbitals between Ag atoms occurs. Therefore, the photocatalyst consisting of the composite of $Ag_2SiO_3$, $Ag_9(SiO_4)_2NO_3$, and $Ag_9(GeO_4)_2NO_3$ may be expected to have an increased charge carrier (e.g., electron) mobility due to the overlap of electron orbitals between Ag atoms.

Optical Absorption Spectrum

Figure 3A:
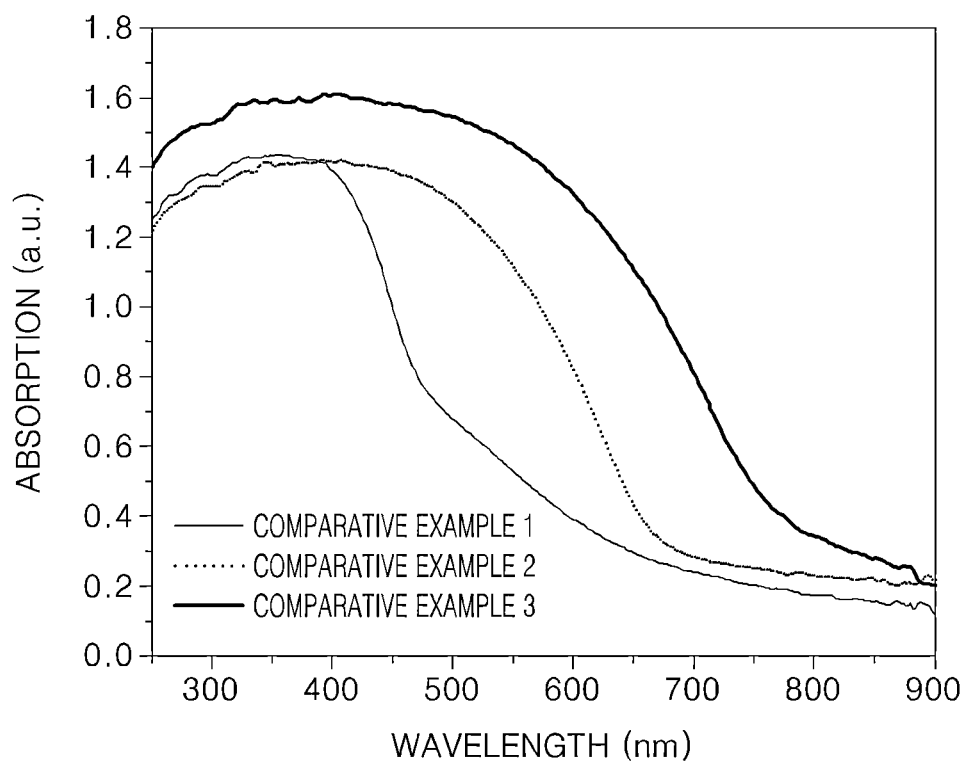
FIG. 3A is a graph of absorption (arbitrary units, a.u.) versus wavelength (nanometers, m) showing optical absorption spectra of photocatalysts prepared according to Comparative Examples 1, 2, and 3 (i.e., $Ag_2SiO_3$, $Ag_9(SiO_4)_2NO_3$, and $Ag_9(GeO_4)_2NO_3$, respectively)
Figure 3B:
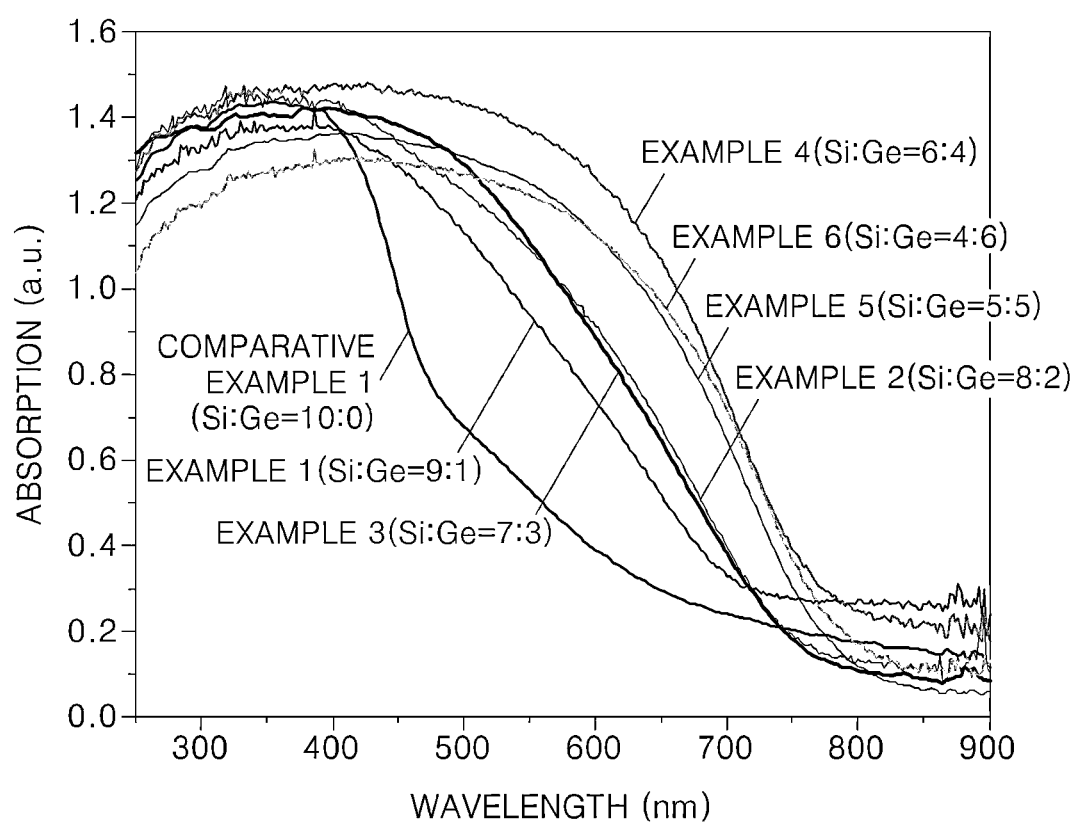
FIG. 3B is a graph of absorption (arbitrary units, a.u.) versus wavelength (nanometers, m) showing optical absorption spectra of the photocatalysts of Examples 1 through 6 and Comparative Example 1.

FIG. 3A is a graph showing optical absorption spectra of the photocatalysts prepared according to Comparative Examples 1, 2, and 3 ($Ag_2SiO_3$, $Ag_9(SiO_4)_2NO_3$, and $Ag_9(GeO_4)_2NO_3$, respectively). FIG. 3B is a graph showing optical absorption spectra of the photocatalysts of Examples 1 through 6 and Comparative Example 1. The optical absorption spectra of FIGS. 3A and 3B were obtained using an ultraviolet-visible light absorption spectroscope (U-3310 spectrophotometer, Hitachi) equipped with an integration sphere.

Referring to FIG. 3A, $Ag_2SiO_3$ has the narrowest absorption band, followed by $Ag_9(SiO_4)_2NO_3$ and $Ag_9(GeO_4)_2NO_3$. These absorption bands indicate that $Ag_2SiO_3$ has a band gap energy of 2.75 eV, $Ag_9(SiO_4)_2NO_3$ has a band gap energy of 2.17 eV, and $Ag_9(GeO_4)_2NO_3$ has a band gap energy of 1.9 eV. That is, the higher the band gap energy, the narrower the absorption band, and the smaller the band gap energy, the wider the absorption band.

Referring to FIG. 3B, absorption bands of the photocatalyst composites of Examples 1 through 6 are wider than that of the photocatalyst composite of Comparative Example 1, and each absorbs in the visible light region. From this result, it is confirmed that of the photocatalyst composites of Examples 1-6, the photocatalyst composites of Examples 4, 5, and 6 have the widest absorption band, followed by the photocatalyst composites of Examples 2 and 3, and the photocatalyst composite of Example 1 has the narrowest absorption band.

Table 1 provides a ratio of Si to Ge and a band gap energy of each of the photocatalyst composites of Examples 1 through 6. The band gap energies of the photocatalyst composites of Examples 1 through 6 were determined from the absorption spectra thereof.

TABLE 1

| Photocatalyst | Ratio of Si to Ge | $E_g$ (eV) |
|---|---|---|
| Example 1 | Si:Ge = 9:1 | 2.32 |
| Example 2 | Si:Ge = 8:2 | 2.33 |
| Example 3 | Si:Ge = 7:3 | 2.18 |
| Example 4 | Si:Ge = 6:4 | 1.89 |
| Example 5 | Si:Ge = 5:5 | 1.92 |
| Example 6 | Si:Ge = 4:6 | 1.84 |

As shown in FIG. 3B, the absorption bands of the photocatalyst composites of Examples 1 through 6 become wider as a ratio of Si to Ge increases, which indicates that as the ratio of Si to Ge increases, the band gap energy decreases.

Since the absorption bands of the photocatalyst composites of Examples 1 through 6 include a visible light region, they may provide improved optical absorption efficiency.

Energy Dispersive Spectroscopy (EDS) Results

Figure 4C:
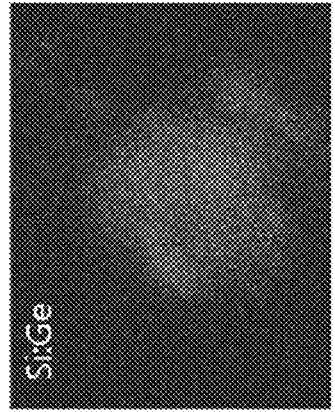
FIGS. 4A to 4F are element mapping images of the photocatalyst of Example 3 obtained by energy dispersive scanning electron microscopy (EDS-SEM), each of which is at the same magnification.
Figure 4F:
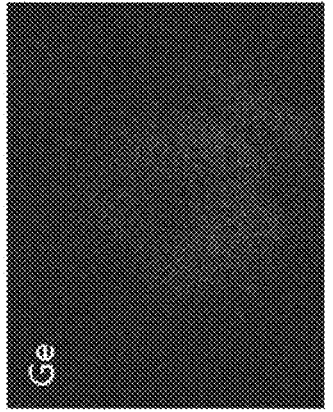
Figure 4B:
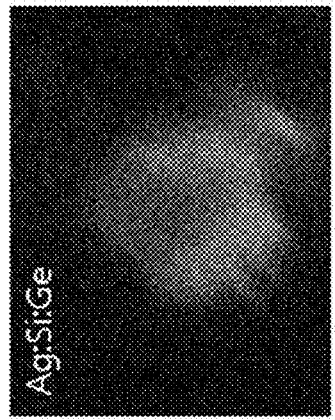
Figure 4E:
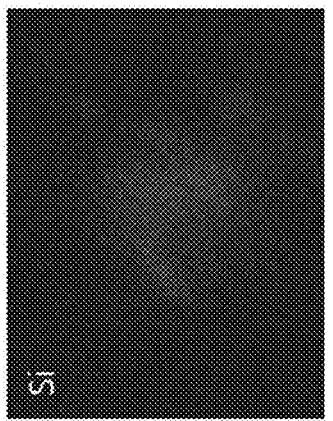
Figure 4A:
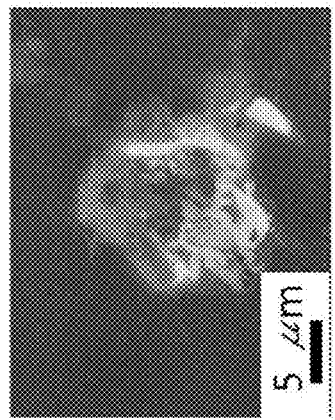
Figure 4D:
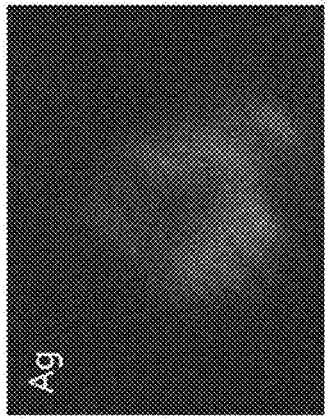

FIGS. 4A to 4F are element mapping images of the photocatalyst composite of Example 3 by scanning electron microscopy (SEM) (see FIG. 4A) and EDS. FIG. 4B shows the distribution of Ag, Si, and Ge, FIG. 4C shows the distribution of Si and Ge, FIG. 4D shows the distribution of Ag, FIG. 4E shows the distribution of Si, and FIG. 4F shows distribution of Ge.

Referring to FIGS. 4A to 4F, Si is more present on an upper portion of the sample and Ge and Ag are more present on a lower portion of the sample. These results show that $Ag_2SiO_3$ containing a relatively greater amount of Si than Ag is present on the upper portion of the sample, and $Ag_9\{(Si_{1-x}Ge_x)O_4\}_2NO_3$ containing a relatively greater amount of Ag than Si is present on the lower portion of the sample. In addition, in FIG. 4, the distribution of Ge is similar to that of Ag, which supports the result that $Ag_9\{(Si_{1-x}Ge_x)O_4\}_2NO_3$ is present on the lower portion of the sample on the images. From these results, and while not wanting to be bound by theory, it understood that $Ag_9\{(Si_{1-x}Ge_x)O_4\}_2NO_3$ and $Ag_2SiO_3$ of the photocatalyst composite of Example 3 are combined to provide a heterojunction.

Electrochemical Potential Diagram

Figure 5:
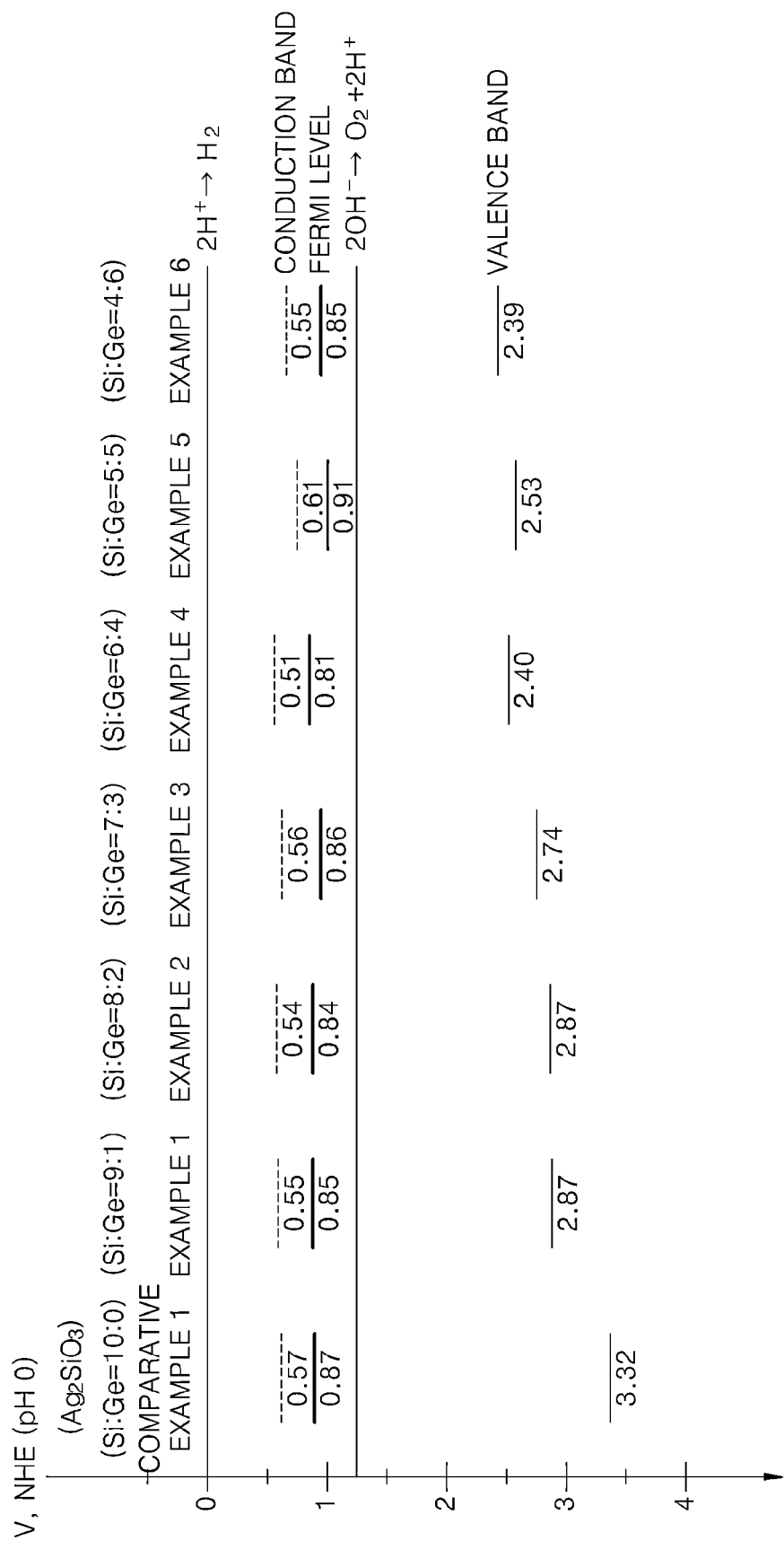
FIG. 5 is a diagram illustrating electrochemical potentials of the photocatalysts of Examples 1 through 6.

FIG. 5 is a diagram illustrating electron energy levels of the photocatalyst composites of Examples 1 through 6. In FIG. 5, a Fermi energy of each of the photocatalyst composites of Examples 1 through 6 was measured by the Mott-Schottky method in which the Fermi energy is obtained from an x-intercept of a Mott-Schottky plot. The slope of the Mott-Schottky plot is used to determine the type of semiconductor and the concentration of the majority carrier. From a slope of the results obtained by the Mott-Schottky method, it was confirmed that the photocatalyst composites of Examples 1 through 6 were n-type semiconductors.

The valence band energy may be obtained by subtracting the band gap energy obtained from a photoabsorption spectrum from the conduction band energy, as described in C. A. Grimes, O. K. Varghese, and S. Ranjn, "Light, Water, Hydrogen: The Solar Generation of Hydrogen by Water Electrolysis," Springer, New York, 2008, p. 139, the content of which in its entirety is incorporated herein by reference.

Referring to FIG. 5, valence band energy levels of the photocatalyst composites of Examples 1 through 6 are greater than an oxidation potential of water, i.e., 1.23 eV, and thus, they have an overpotential with respect to a reaction for generating oxygen from water. The overpotential of the photocatalyst composites of Examples 1 through 6 are each less than that of Comparative Example 1, for example. In an embodiment, the photocatalyst has an overpotential for water oxidation of less than about 2.3V, specifically less than about 2V, more specifically less than about 1.7V, or about 0.1 to about 2.3V, specifically about 0.2 to about 1.7V, more specifically about 0.4 to about 1.5V. Due to the reduced overpotential, the photocatalyst composites of Examples 1 through 6 provide a reduced energy barrier for oxidation at a surface thereof on which a reaction occurs, thereby being able to more efficiently oxidize water or an organic material when illuminated with sunlight. Thus an efficiency of the disclosed photocatalyst composite as a visible light photocatalyst is improved.

In the energy level diagram of FIG. 5, as a ratio of Si to Ge in the photocatalyst composites increases, conduction band energy levels and Fermi energy levels thereof are almost constant, while valence band energy levels of the photocatalyst composites decrease. From this result, it is confirmed that as the ratio of Si to Ge increases, the overpotential for the oxidation of water or an organic material decreases.

Example 7

Manufacture of Photocatalyst Electrode

A carbon paste was applied to a thickness of about 100 micrometers on a glass substrate on which FTO was deposited, and the photocatalyst powder prepared according to Example 1 was then placed on the carbon paste. Subsequently, the carbon paste covered by the photocatalyst powder was pressed with a glass plate in order to improve contact between the photocatalyst powder and the carbon paste, thereby completing production of the photocatalyst electrode.

Example 8

Manufacture of Photocatalyst Electrode

A photocatalyst electrode was manufactured in the same manner as in Example 7, except that the photocatalyst powder prepared according to Example 2 was used instead of the photocatalyst powder of Example 1.

Example 9

Manufacture of Photocatalyst Electrode

A photocatalyst electrode was manufactured in the same manner as in Example 7, except that the photocatalyst powder prepared according to Example 3 was used instead of the photocatalyst powder of Example 1.

Example 10

Manufacture of Photocatalyst Electrode

A photocatalyst electrode was manufactured in the same manner as in Example 7, except that the photocatalyst powder prepared according to Example 4 was used instead of the photocatalyst powder of Example 1.

Example 11

Manufacture of Photocatalyst Electrode

A photocatalyst electrode was manufactured in the same manner as in Example 7, except that the photocatalyst powder prepared according to Example 5 was used instead of the photocatalyst powder of Example 1.

Example 12

Manufacture of Photocatalyst Electrode

A photocatalyst electrode was manufactured in the same manner as in Example 7, except that the photocatalyst powder prepared according to Example 6 was used instead of the photocatalyst powder of Example 1.

Comparative Example 4

Manufacture of Photocatalyst Electrode

A photocatalyst electrode was manufactured in the same manner as in Example 7, except that the photocatalyst powder prepared according to Comparative Example 1 was used instead of the photocatalyst powder of Example 1.

Comparative Example 5

Manufacture of Photocatalyst Electrode

A photocatalyst electrode was manufactured in the same manner as in Example 7, except that the photocatalyst powder prepared according to Comparative Example 2 was used instead of the photocatalyst powder of Example 1.

Comparative Example 6

Manufacture of Photocatalyst Electrode

A photocatalyst electrode was manufactured in the same manner as in Example 7, except that the photocatalyst powder prepared according to Comparative Example 3 was used instead of the photocatalyst powder of Example 1.

Decomposition of Organic Material of Photocatalyst Powder 0.15 g of the photocatalyst powder of Example 1 was added to 50 mL of an aqueous solution containing 15.3 mg/L Rhodamine B (RhB). While the RhB aqueous solution including the photocatalyst powder of Example 1 was being mixed using a magnetic stirrer, light from an Xenon (Xe) lamp (450 W, Newport) equipped with an optical filter that transmits light having a wavelength of 430 nm or more was irradiated thereto. The same organic material decomposition test as that performed on the photocatalyst powder of Example 1 was performed on the photocatalyst powders of Examples 2 through 5 and Comparative Examples 1 through 3.

Figure 6:
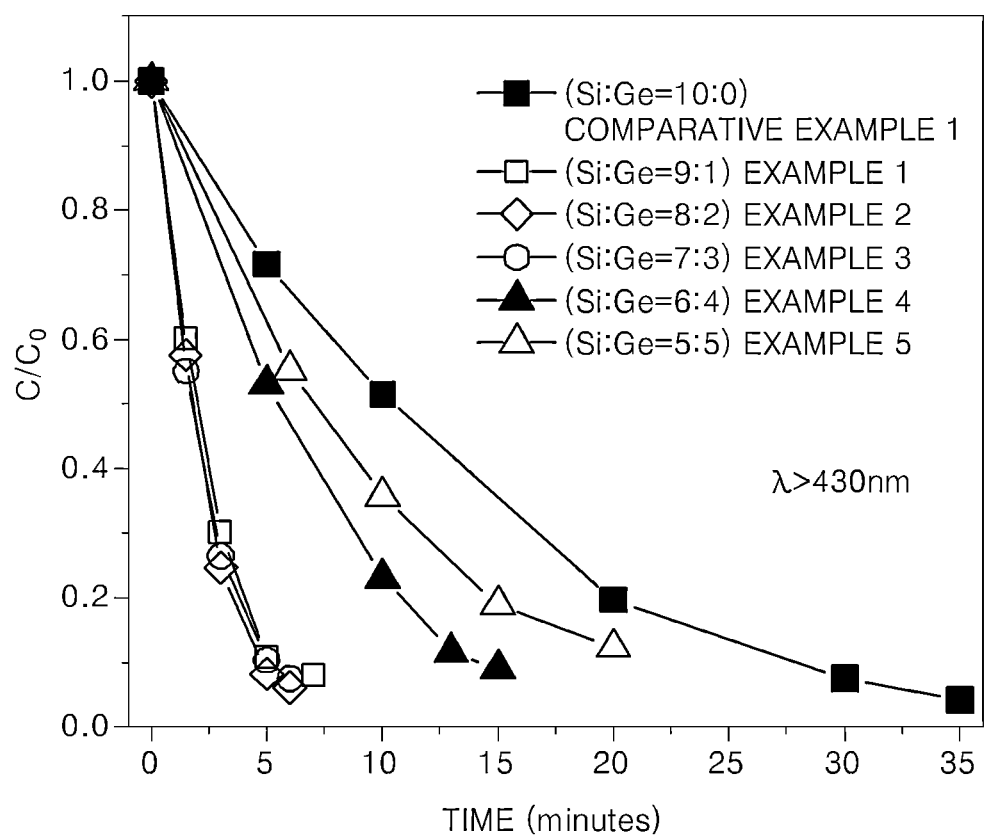
FIG. 6 is a graph of normalized optical absorption ($C/C_o$) versus time (minutes) showing measurement results of changes in optical absorption intensity over time of Rhodamine B aqueous solutions of photocatalyst powders of Examples 1 through 5 and Comparative Example 1 after irradiation of light from an Xenon (Xe) lamp.

FIG. 6 is a graph showing measurement results of changes in optical absorption intensity over time of RhB aqueous solutions of photocatalyst powders of Examples 1 through 5 and Comparative Example 1 after irradiation of light from an Xe lamp. The values at the Y-axis of the graph of FIG. 6 are obtained by dividing an optical absorption intensity (C) of the RhB aqueous solution after irradiation of light by an optical absorption intensity ($C_0$) of the RhB aqueous solution before irradiation of light.

Referring to FIG. 6, of the photocatalysts of Examples 1 through 5 and Comparative Example 1, the optical absorption intensities of the RhB aqueous solutions of the photocatalyst powders of Examples 1 through 3 most rapidly decrease, followed by the optical absorption intensities of the Rhb aqueous solutions of the photocatalyst powders of Examples 4 and 5 and Comparative Example 1. That is, the organic material decomposition rates of the photocatalyst powders of Examples 1 through 5 are faster than that of the photocatalyst powder of Comparative Example 1. The rapid organic material decomposition rates of the photocatalyst powders of Examples 1 through 5 are understood to occur because the photocatalyst composites of Examples 1 through 5 are capable of absorbing a wider range of visible light and thus have higher optical absorption efficiency, and electrons and holes generated by optical absorption are effectively separated from each other and thus the lifetime of activated charges increases, resulting in increased efficiency of the photocatalyst.

Water Decomposition of Photocatalyst Electrode

The photocatalyst electrode manufactured according to Example 9, a Pt counter electrode, and an Ag/AgCl reference electrode were put in 0.1M $KNO_3$ as an electrolyte and then connected to a potentiostat (Parstat 2273, Princeton Applied Research), thereby completing the manufacture of a water decomposition cell.

Current-voltage (I-V) characteristics were measured without irradiation of light (i.e., dark mode), while a voltage from 0.5 V to 1.0 V was being applied relative to the reference electrode. The I-V characteristics were measured while white light from an Xe lamp (450 W, Newport) equipped with an optical filter that transmits light having a wavelength of 430 nm or more was being irradiated to the water decomposition cell (light irradiation mode) and a voltage from 0.5 V to 1.0 V was being applied relative to the reference electrode.

Water decomposition cells, including the photocatalyst electrodes of Examples 11 and 12 and Comparative Examples 4 through 6, respectively, were manufactured using the same method as that used to manufacture the water decomposition cell, including the photocatalyst electrode of Example 9, and I-V characteristics of each water decomposition cell were measured in a dark mode and a light irradiation mode.

Figure 7A:
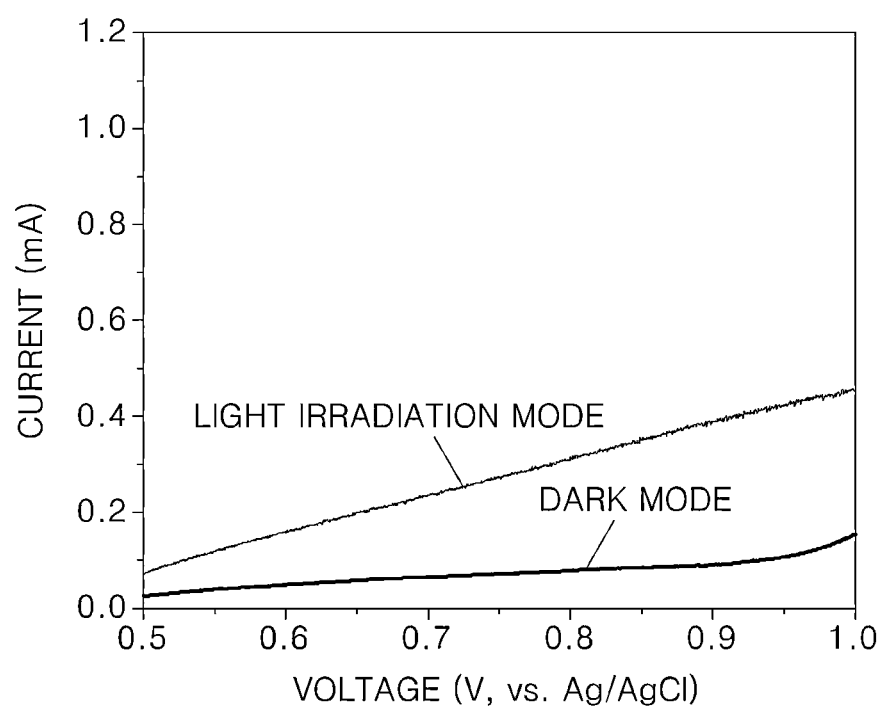
FIGS. 7A through 7C are graphs of current (milliamperes) versus voltage (Volts versus Ag/AgCl) showing current-voltage (I-V) characteristics of electrochemical water decomposition cells manufactured using the photocatalyst electrodes of Examples 9, 11, and 12, respectively.
Figure 7B:
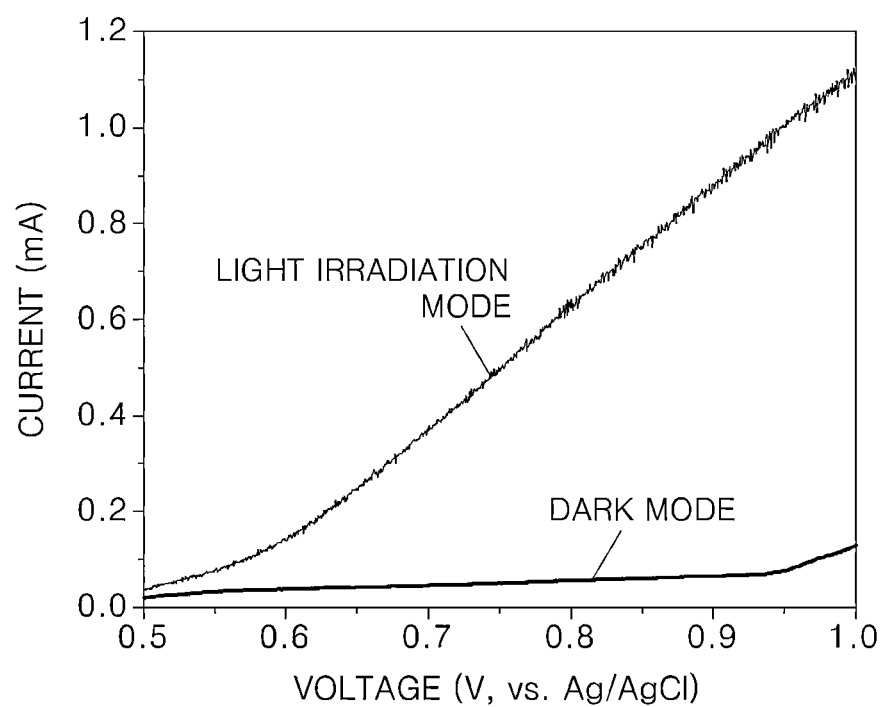
Figure 7C:
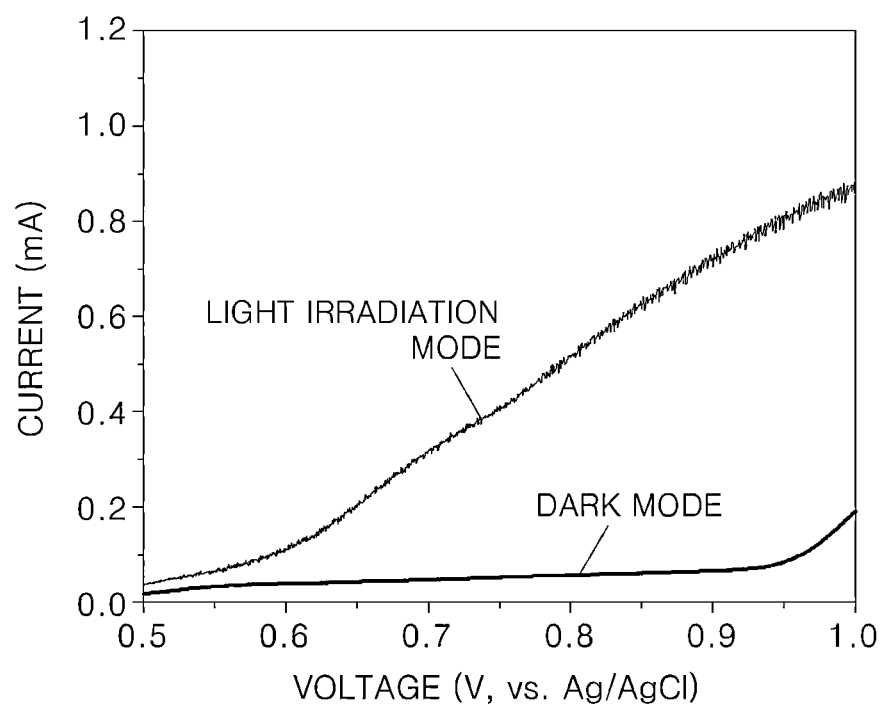
Figure 7D:
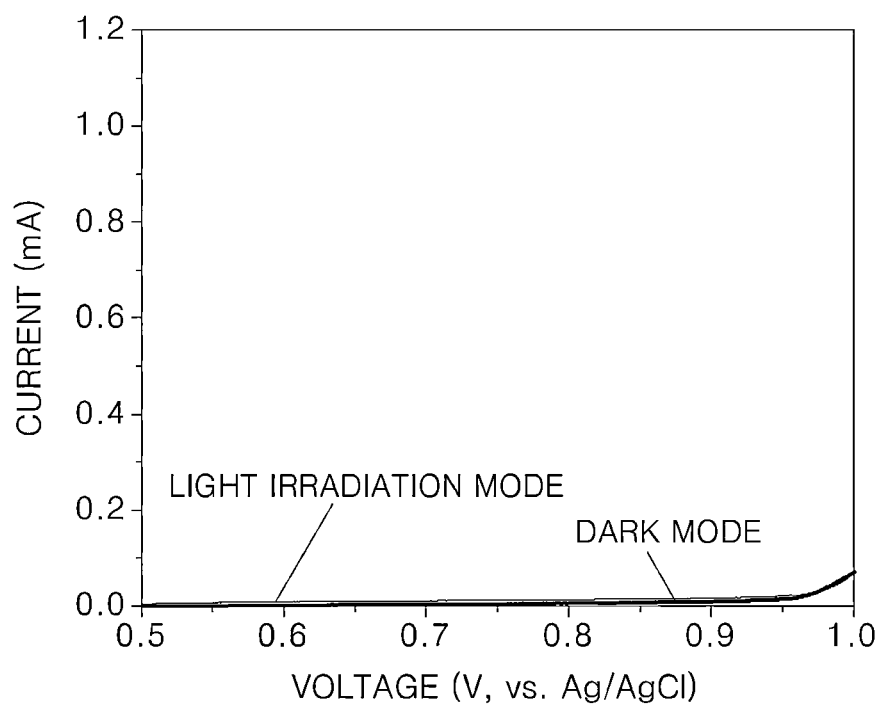
FIGS. 7D through 7F are graphs of current (milliamperes) versus voltage (Volts versus Ag/AgCl) showing I-V characteristics of electrochemical water decomposition cells manufactured using photocatalyst electrodes of Comparative Examples 4, 5, and 6, respectively.
Figure 7E:
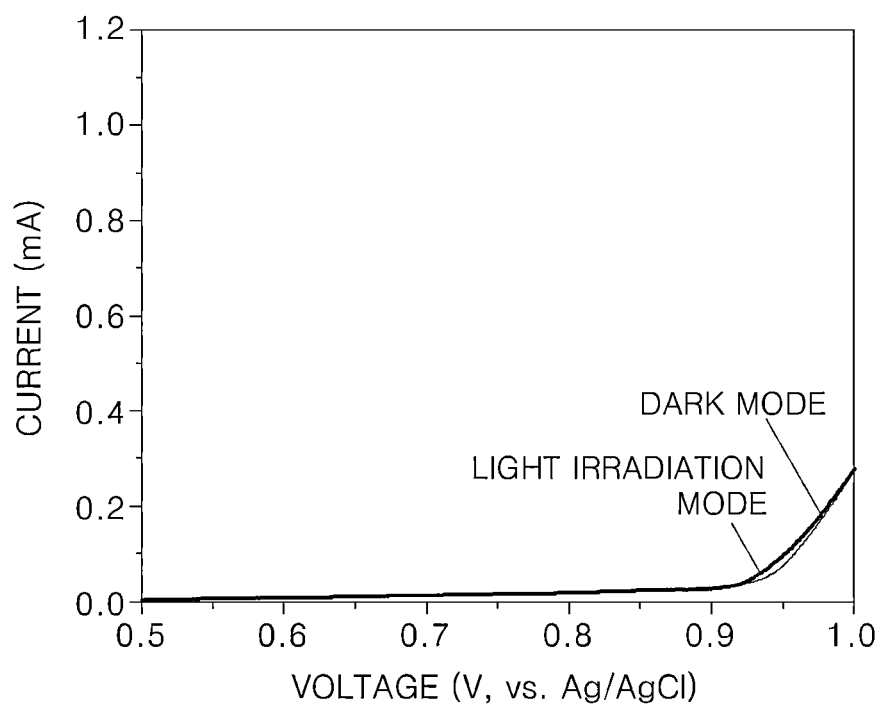
Figure 7F:
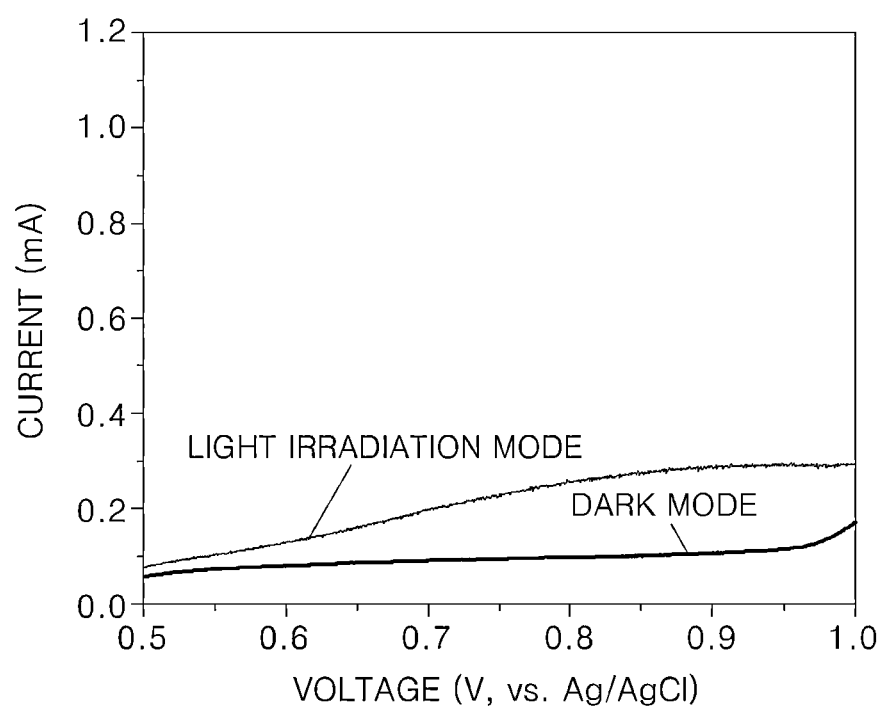

FIGS. 7A through 7C are graphs showing I-V characteristics of the water decomposition cells manufactured using the photocatalyst electrodes of Examples 9, 11, and 12, respectively, and FIGS. 7D through 7F are graphs showing I-V characteristics of the water decomposition cells manufactured using the photocatalyst electrodes of Comparative Examples 4, 5, and 6, respectively.

As shown in FIGS. 7A through 7C, it was observed that a current does not flow in each of the water decomposition cells of Examples 9, 11, and 12 in the dark mode, while a current flows therein proportionate to the applied voltage in the light irradiation mode. The intensity of the generated current increases in this order from the photocatalyst electrode of Example 11 to the photocatalyst electrode of Example 12 to the photocatalyst electrode of Example 9. A current in the vicinity of 1 V in the dark mode is electrolysis current at which water is decomposed by the applied voltage.

The single phases $Ag_2SiO_3$, $Ag_9(SiO_4)_2NO_3$, and $Ag_9(GeO_4)_2NO_3$ exhibited lower photocurrent than that of the photocatalyst composites. Referring to FIGS. 7D and 7E, the photocatalyst electrodes of Comparative Examples 4 and 5 had a photocurrent of several microamperes (μAs) in the light irradiation mode. As shown in FIG. 7F, it was observed that a current did not flow in the photocatalyst electrode of Comparative Example 6 in the dark mode, while a current of 0.2 milliamperes (mA) flowed therein according to the applied voltage in the light irradiation mode.

As described above and while not wanting to be bound by theory, according to an embodiment a photocatalyst has a band gap energy suitable for absorption of visible light and thus has high visible light absorption efficiency, has a bond between metal atoms which has a length that is smaller than a Van der Waals distance therebetween, and thus has high electron mobility due to an overlap of electron orbitals between the metal atoms, and includes metal oxides that are combined to provide a heterojunction, thereby separating electrons and holes by an intrinsic potential, which results in a decrease in a probability of recombination between the electrons and the holes.

It should be understood that the exemplary embodiments described herein should be considered in a descriptive sense only and not for purposes of limitation. Descriptions of features, advantages, or aspects within each embodiment shall be considered as available for other similar features, advantages, or aspects in other embodiments.

What is claimed is:

1. A visible light sensitive photocatalyst comprising:
a composite comprising a first metal oxide, a second metal oxide, and a heterojunction therebetween,
wherein the first and second metal oxides each comprise a Group 11 metal,
wherein a first bond between metal atoms of the first metal oxide has a length that is smaller than a Van der Waals distance between the metals of the first bond,
wherein a second bond between metal atoms of the second metal oxide has a length that is smaller than a Van der Waals distance between the metals of the second bond, and
wherein the composite has a band gap energy of about 1.0 electron volt to about 2.5 electron volts.

2. The visible light sensitive photocatalyst of claim 1, wherein the first and second metal oxides each have a band gap energy of about 1.0 electron volt to about 2.5 electron volts.

3. The visible light sensitive photocatalyst of claim 1, wherein the first metal oxide of the visible light sensitive photocatalyst is represented by Formula 1 and the second metal oxide is represented by Formula 2:

$$M^1_m(Q_aA_{1-a})_bO_c, \quad \text{Formula 1}$$

wherein, in Formula 1, $M^1$ is Cu, Ag, or Au, Q and A are each independently Si, Ge, or Sn, $1.5 \le m \le 2.5$, $0 \le a \le 1$, $0.7 \le b \le 1.3$, and $2.7 \le c \le 3.3$,

$$M^1_n\{(Q_dA_{1-d})O_e\}_fR^1_g \quad \text{Formula 2}$$

wherein, in Formula 2, $M^1$ is Cu, Ag, or Au, Q and A are each independently Si, Ge, or Sn, $R^1$ is $-NO_3$, $-F$, $-Cl$, $-Br$, $-I$, or a combination thereof, $8 \le n \le 10$, $0 \le d \le 1$, $3.5 \le e \le 4.5$, $1.5 \le f \le 2.5$, and $0.5 \le g \le 1.5$.

4. The visible light sensitive photocatalyst of claim 3, wherein Q is Si and A is Ge or Sn.

5. The visible light sensitive photocatalyst of claim 4, wherein the first metal oxide is $Ag_2SiO_3$, and the second metal oxide is $Ag_9\{(Si_xGe_{1-x})O_4\}_2NO_3$ wherein $0 \le x \le 1$, and the $Ag_2SiO_3$ and $Ag_9\{(Si_xGe_{1-x})O_4\}_2NO_3$ form a heterojunction.

6. The visible light sensitive photocatalyst of claim 5, wherein x satisfies the inequality $0.1 \le x \le 0.5$.

7. The visible light sensitive photocatalyst of claim 5, wherein the band gap energy is about 1.7 electron volts to about 2.4 electron volts.

8. The visible light sensitive photocatalyst of claim 7, wherein a valence band has an energy of less than 3 electron volts versus a normal hydrogen electrode.

9. The visible light sensitive photocatalyst of claim 8, having an overpotential for water oxidation of less than about 2.3 volts.

10. The visible light sensitive photocatalyst of claim 8, having an overpotential for water oxidation of about 0.1 to about 2.3 volts.

11. The visible light sensitive photocatalyst of claim 5, wherein a molar ratio of $Ag_2SiO_3$ to $Ag_9\{(Si_xGe_{1-x})O_4\}_2NO_3$ wherein $0 \le x \le 1$ is about 100:1 to 1:100.

12. An electrode comprising the visible light sensitive photocatalyst according to claim 1.

13. An electrochemical water decomposition cell comprising:
a working electrode comprising the visible light sensitive photocatalyst according to claim 1 and a counter electrode.

14. The electrochemical water decomposition cell of claim 13, further comprising a reference electrode.

15. An organic material decomposition system comprising:
a vessel; and
the visible light sensitive photocatalyst according to claim 1 disposed in the vessel.

16. The system of claim 15, wherein the vessel is transparent.

17. The system of claim 15, further comprising a composition in which the visible light sensitive photocatalyst according to claim 1 is dispersed.

18. The system of claim 17, wherein the composition comprises water.

19. The system of claim 17, wherein the composition comprises an organic material.

20. A photocatalyst comprising:

a first metal oxide represented by Formula 1:

Formula 1

$$M^1{}_m(Q_a A_{1-a})_b O_c,$$

wherein, in Formula 1, $M^1$ is Cu, Ag, Au, or a combination thereof, Q and A are each independently Si Ge, or Sn, $1.5 \leq m \leq 2.5$, $0 \leq a \leq 1$, $0.7 \leq b \leq 1.3$, and $2.7 \leq c \leq 3.3$;

a second metal oxide represented by Formula 2:

Formula 2

$$M^1{}_n\{(Q_d A_{1-d})O_e\}_f R^1{}_g$$

wherein, in Formula 2, $M^1$ is Cu, Ag, Au, or a combination thereof, Q and A are each independently Si, Ge, or Sn, $R^1$ is $-NO_3$, $-F$, $-Cl$, $-Br$, $-I$, or a combination thereof, $8 \leq n \leq 10$, $0 \leq d \leq 1$, $3.5 \leq e \leq 4.5$, $1.5 \leq f \leq 2.5$, and $0.5 \leq g \leq 1.5$; and a heterojunction between the first and second metal oxides.

* * * * *